Dec. 18, 1923.   1,477,994
A. BÜCHI
TWO-STROKE CYCLE INTERNAL COMBUSTION ENGINE AND SCAVENGING AND
CHARGING PROCESS THEREOF
Filed March 31, 1921   3 Sheets-Sheet 1
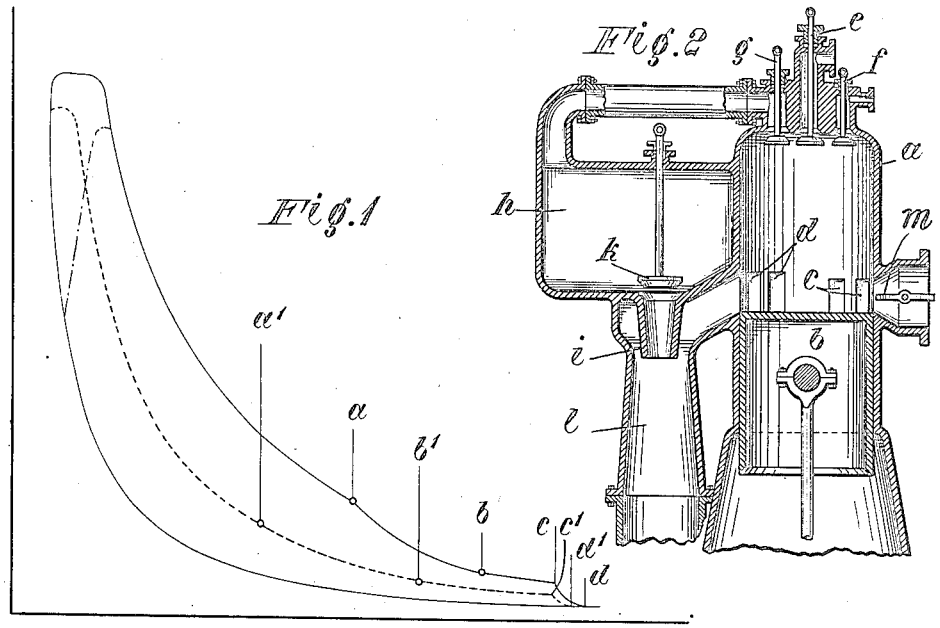

Dec. 18, 1923.  1,477,994
A. BÜCHI
TWO-STROKE CYCLE INTERNAL COMBUSTION ENGINE AND SCAVENGING AND
CHARGING PROCESS THEREOF
Filed March 31, 1921     3 Sheets-Sheet 2
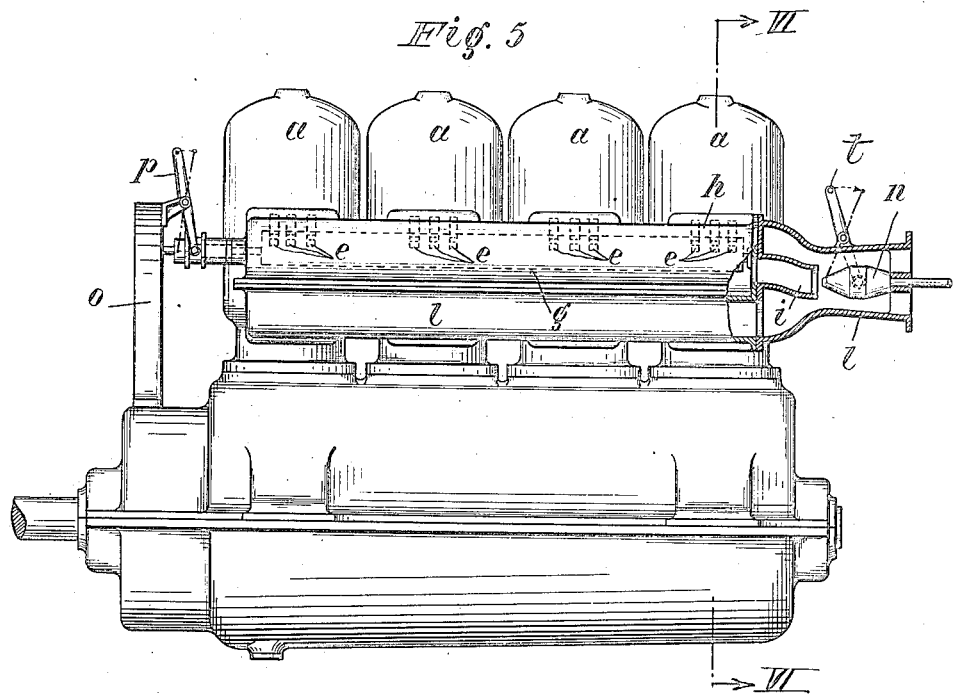
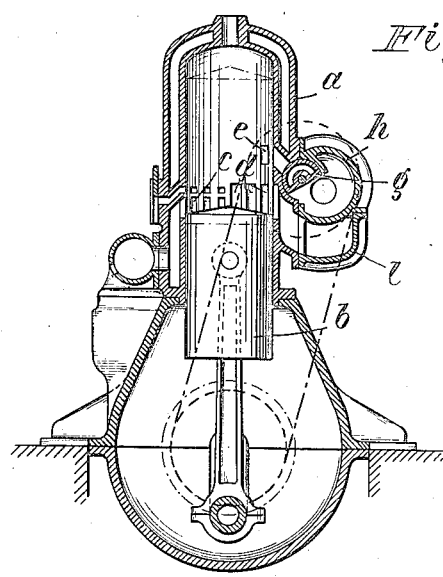
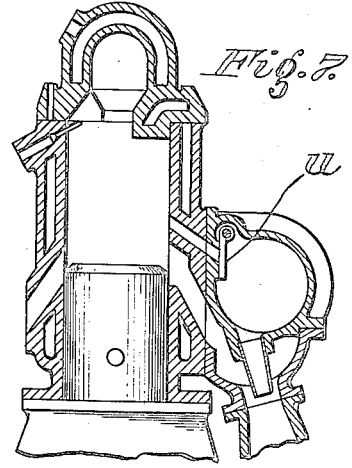
Inventor:
Alfred Büchi Patented Dec. 18, 1923.

1,477,994

UNITED STATES PATENT OFFICE.

ALFRED BÜCHI, OF WINTERTHUR, SWITZERLAND.

TWO-STROKE-CYCLE INTERNAL-COMBUSTION ENGINE AND SCAVENGING AND CHARGING PROCESS THEREOF.

Application filed March 31, 1921. Serial No. 457,352.

(GRANTED UNDER THE PROVISIONS OF THE ACT OF MARCH 3, 1921, 41 STAT. L., 1313.)

*To all whom it may concern:*

Be it known that I, ALFRED BÜCHI, a citizen of the Republic of Switzerland, residing at Winterthur, Switzerland, have invented certain new and useful Improvements in Two-Stroke-Cycle Internal-Combustion Engines and Scavenging and Charging Processes Thereof (for which I have filed applications in Switzerland Aug. 8, 1918, application No. 95,112; in Germany Aug. 16, 1919, application No. B90,425; in France Sept. 9, 1919, Patent No. 503,591; in England Aug. 18, 1919, Patent No. 131,592; in Italy Sept. 12, 1919, application No. 38/10; and in Belgium Sept. 10, 1919, application No. 226,070); and I do hereby declare the following to be a clear, full, and exact description of the invention, such as will enable others skilled in the art to which it appertains to make and use the same, reference being had to the accompanying drawing and to letters or figures of reference marked thereon, which form a part of this specification.

In internal combustion engines it has already been proposed to use the inertia of the exhausting gases for the purpose of drawing off the burned charge from the cylinders. These exhaust gases, however, contain little energy and consequently their drawing-off action is not very effective owing to the low efficiency of the drawing-off devices.

According to this invention combustion gases are employed during the expansion stroke and before the exhaust takes place, said combustion gases being taken from the interior of the cylinder at a high pressure and conveyed into a receiver, so that after the pressure has become equalized with that of the atmosphere the residue of the combustion gases remaining in the cylinder is drawn off, and the cylinder can be filled with a fresh charge. This is designed for the purpose of dispensing with the provision of special scavenging and charging pumps in two-stroke cycle engines, notwithstanding that there is a partial diminution of the work done by the expansion of the combustion gases.

The conveyance of the combustion gases into the receiver is effected preferably by suitable devices or slots in the wall of the cylinder. If fresh air only is sucked in, as is the case for instance in Diesel engines, this air can enter directly into the cylinder from the atmosphere. In internal combustion engines the new charge can be taken wholly from the mixture pipe, or partly from the atmosphere, and partly from gasholders, carburetters, etc. The passage of the combustion gases from the cylinder into the receiver and their exit from the said receiver are suitably controlled. Preferably, the said control of the gases passing through the receiver is adjusted to suit the load and speed of the engine. In the case of multi-cylinder engines a common receiver may be provided for all or some of the cylinders. In this case it is also advisable to provide each receiver with only one exit orifice delivering into the exhaust pipe of the engine. The contents of the receiver are then discharged into the common exhaust pipe, and they suck the burned gases out of the several cylinders, so that the latter can be filled with fresh charge. Since the requisite length of the scavenging and charging periods of a cylinder is about $\frac{1}{5}$ to $\frac{1}{3}$ of one revolution of the engine, it is found that in engines having a common receiver for three or more cylinders there will be an approximately continuous outflow from the said cylinders. Consequently it will not be necessary to provide a controlling gear for the gases passing out of the receiver, so that the exit orifice can remain permanently open. Even if the exit velocity should fluctuate somewhat in this arrangement, that is of no practical importance.

The accompanying drawings are merely intended to explain the process and show the parts of the machines in a diagrammatic manner only the manner of actuating controlling members and the like not being disclosed in detail as it is well known in the art.

A work diagram of an engine working on this improved scavenging and charging process is illustrated in Fig. 1 of the accompanying drawings.

Fig. 2 is a longitudinal section through the cylinder of a single cylinder Diesel engine provided with the installation for carrying out the charging and scavenging process according to the invention;

Fig. 3 shows in longitudinal section the cylinder of a counter piston engine and the installation, for charging and scavenging.

Fig. 4 illustrates in longitudinal section the cylinder and the arrangement for charging and scavenging a double acting internal combustion engine.

Fig. 5 is an elevation view of a four-cylinder engine, and

Fig. 6 is a vertical section along line VI—VI of Fig. 5;

Fig. 7 illustrates a single acting engine partly shown in section and provided with a modified type of valve for closing ports.

Figure 8:
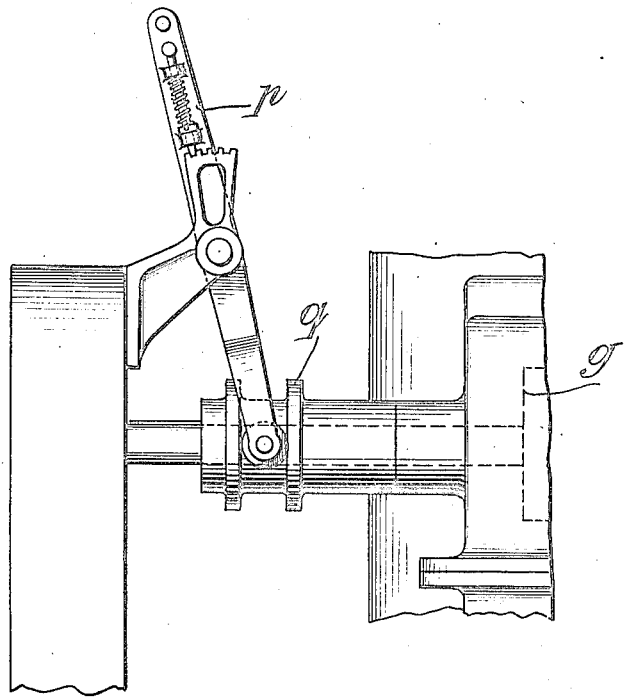
Figures 8 to 10 are detail views in different positions of a well-known mechanism for effecting the retardation and advance of time of opening of the ports of the stored gas container.
Figure 9:
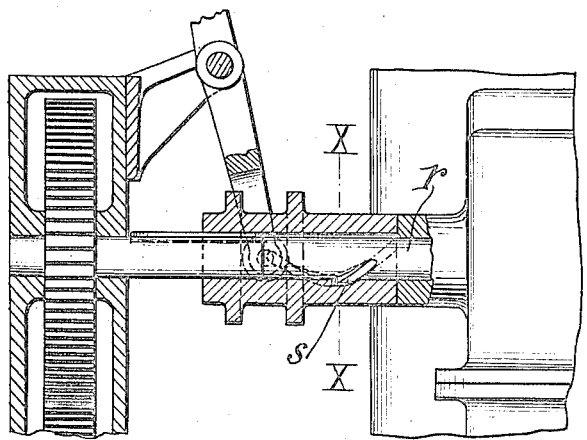
Figure 10:
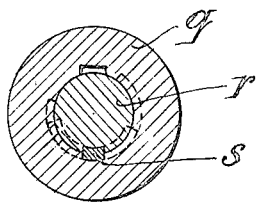

In Fig. 1 the curve shown in full lines represents the pressures during one revolution of a two-stroke cycle Diesel engine. At the point $a$ during the expansion stroke the gases begin to pass over into a large receiver. This passing over may continue for instance up the position $b$ of the piston. At this instant the same pressure will exist in the cylinder as in the receiver. From the piston position $b$ onward the combustion gases contained in the cylinder will expand until the piston is in the position $c$. In this position $c$ the exhaust devices proper open, and an equalization of the pressure with the atmosphere will take place as far as position $d$. In the neighbourhood of the piston position $d$ the gases that have entered the receiver during the portion $a$—$b$ of the stroke, will now begin to exhaust with great velocity through a nozzle into the exhaust pipe of the engine. The stream of gas carries with it the gases contained in the exhaust pipe, and sucks out the contents of the cylinder so that the cylinder will become filled with fresh charge. This fresh charge enters the cylinder through special apertures which open likewise only after the pressure has become equalized with the atmosphere, that is to say, in the neighbourhood of the piston position $d$. These apertures are closed after the charging operation has been completed.

The dotted curve is an idly-running curve. The time of the flow of the combustion gases into the receiver is shifted still further towards the ignition dead-centre, and this flow begins at the piston position $a^1$. It is assumed that this flow terminates on reaching the piston position $b^1$ and that the expansion of the gases contained in the cylinder continues along the piston path $b^1$ $c^1$. At the position $c^1$ the exit orifices open, whereupon the pressure is equalized with the atmosphere and continues as for as $d^1$, where the sucking of the contents of the cylinder out of the latter can begin by the action of the gases that now flow with high velocity out of the receiver. In this case the flow of the combustion gases into the receiver begins at such an early period in order that at the reduced pressures existing in the working cylinder whilst the engine is running idly, sufficient energy for sucking out the contents of the cylinder will still be contained by the gases that pass into the receiver. Exactly the same procedure may take place for the purpose of producing a sufficient scavenging effect, in starting with compressed air, in cases where the amount of pressure energy in the cylinder is likewise small.

According to the speed of revolution of the engine and its load, there will be required a determined amount of fresh charge. The period of flow into the receiver is therefore suitably shifted to any point of the stroke to suit the working requirements. Moreover, the exit orifice of the receiver may be adjusted in such manner that a maximum effect is produced for sucking out by the existing energy of the receiver gases. Devices for carrying out said adjustments are illustrated in Fig. 5, hereafter described. The flow may also take place for all loads and speeds of revolution at the same point of the stroke, and there need not be any regulation of the cross section of the exit from the receiver; both these things serving to simplify the construction of the engine.

For the purpose of producing a determined pressure in the interior of the cylinder the pipe leading to the admission devices for the new charge may be provided with a regulating apparatus.

Fig. 2 illustrates a single-cylinder Diesel engine. $a$ is the working cylinder in which the piston $b$ moves. $c$ are the slots for the admission of the charge, and $d$ are the outlets. In the cylinder there is arranged a fuel valve $e$ and a starting valve $f$. A valve $g$ is provided in the cylinder cover for the purpose of carrying into effect the improved scavenging process. The combustion gases pass through this valve into the receiver $h$. This receiver has an outlet orifice $i$ which can be closed by the valve $k$. The outlet orifice $i$ acting as an ejector opens into the exhaust pipe $l$ which is connected with the interior of the cylinder by means of the slots $d$. The valve $g$ is opened towards the middle of the expansion stroke or later, and then a portion of the combustion gases flows into the receiver $h$, the valve $k$ being closed. This flow lasts until the pressures in the working cylinder $a$ and in the closed receiver $h$ become equal. After this equalization of pressure the valve $g$ is closed before the exhaust slots are opened. Then as the piston continues to move, a further expansion of the combustion gases takes place in the cylinder. Subsequently, the piston uncovers the exhaust slots $d$, and pressure equalization takes place with the exhaust pipe $l$. Shortly after this moment the scavenging and charging operation begins. For this purpose the valve $k$ is opened and the contents of the receiver flow with great velocity through the nozzle $i$ into the exhaust pipe $l$. The combustion gases passing out from the receiver $h$ exert a suction upon the space around the nozzle $i$, the exhaust slots $d$ and the interior of the cylinder, so that when the admission slots $c$ are uncovered by the piston $b$, the contents of the cylinder are sucked out and the latter is filled with fresh charge. A flap valve $m$ is provided in the pipe leading to the admission slots $c$ for the purpose of regulating the amount of admission of the air.

The admission slots $c$ open only after equalization of pressure with the atmosphere has taken place, that is to say, after the determined opening of the exit slots $d$ for the purpose of preventing the exhaust gases from passing through the admission slots $c$ into the pipe leading to the latter. Consequently the admission slots $c$ do not extend so far up as the exhaust slots $d$. This necessitates in turn that in the return movement of the piston the admission slots must close again first, and then the exhaust slots $d$ will close later on.

Fig. 3 illustrates the application of the improved process to a counter-piston engine. $a$ is the cylinder; $b$ are the pistons; $c$ are the admission ports; and $d$ are the exhaust ports. The withdrawal of the combustion gases from the cylinder is effected in this arrangement through apertures $e$ which are arranged in the cylinder wall and which are adapted to be closed against the receiver $h$ by means of the slide $g$. The outflow from the receiver $h$ takes place through a valve $k$ and the outlet $i$ into the exhaust pipe $l$. The admission of the charge through the ports $c$ can be controlled by a varying adjustment of the valve $m$.

By a determined arrangement of the cranks in a counter-piston engine the admission slots can be arranged to be closed at the same time as or only after the exhaust slots, by the piston $b$, in spite of the fact that the opening of the admission slots $c$ begins only after an equalization of pressure has taken place between the interior of the cylinder and the atmosphere.

Fig. 4 illustrates a double-acting engine. $a$ is the cylinder; and $b$ is the piston; $c$ are the admission ports; and $d$ are the exhaust ports. Only one receiver $h$ is provided for both ends of the cylinder. A portion of the combustion gases controlled by the ports $e$ and the devices $g$, flows into this receiver $h$. This outflow from this receiver takes place through the nozzle $i$ which opens into an exhaust pipe $l$ that is likewise common to both ends of the cylinder. This exhaust pipe $l$ contains also a device $n$ by means of which the cross sectional passage area of the exhaust pipe $l$ and the cross sectional passage area of the nozzle $i$ can be regulated.

Figs. 5 and 6 illustrate a four-cylinder engine. It is assumed that this engine is working on the explosion method. The application to an internal combustion engine, such as for instance Diesel engines, incandescent head engines, etc., is obvious because all these engines differ as regards the scavenging and charging processes from one another, only by the fact that in explosion engines a combustible mixture is introduced into the cylinder, and in other types of internal combustion engines air alone is introduced into the cylinder.

$a$ are the four working cylinders of the engine; $b$ are the pistons; $c$ are the admission ports provided in the side of each cylinder; and $d$ are the oppositely situated ports for the exhaust of the exhaust gases into the exhaust pipe $l$ which is common to all the cylinders. The withdrawal of combustion gases during the expansion and its conveyance into the receiver $h$ that is common to all the cylinders, takes place through the slots $e$ provided in the sides of the cylinders, these slots being controlled by the piston and by a rotary valve $g$. The rotary valve $g$ is driven by means of a silent chain $o$ from the distribution shaft. For the purpose of varying the instant of the outflow into the receiver, the valve $g$ may be operated differently as regards time. To this end a lever $p$ is provided co-acting with a coupling sleeve $q$. Upon a displacement of the sleeve $q$ in the axial direction, the angular position of the valve $g$ keyed to the shaft $r$ is altered, the key $s$ being arranged at an angle to the longitudinal axis of the shaft $r$, similar to a square screw thread, whereupon the valve $g$ opens and closes at a different moment. The above means for changing the timing of the valve is known, and no claim is made to this specific structure. The period of flow into the receiver and the amount of fresh charge can thus be altered to suit working requirements. The needle valve $n$ which by an axial displacement, caused by hand or by a governor, alters the effective area of the nozzle $i$ and of the exhaust pipe $l$, serves to control the discharge of the exhaust gases, and to control thereby the sucking out of the gases, and the amount of fresh charge, therefore, can be determined to suit existing working conditions. The combustion gases which enter the receiver $h$ under pressure, flow continuously through the nozzle $i$ into the exhaust pipe $l$ where they suck out the exhaust gases contained in the said pipe and in the cylinders, so that the latter can be filled with a fresh charge. A device $n$ is provided in the exhaust pipe $l$ for controlling the sucking out of the gases. Two rows of inlet apertures $c$ are provided. Only atmospheric air enters through the upper series, whereas through the lower series which are open later, there takes place only the admission of mixture, or solely of fuel, such as gaseous mixtures containing benzine-benzol vapours, etc. This arrangement is designed to prevent the inflowing combustible mixture from becoming ignited prematurely at the commencement of the scavenging operation. The height of the apertures $c$ and consequently the quantity of the air that enters first, is preferably such that the temperature of the interior of the cylinder will be sufficiently reduced thereby before the admission of the combustible mixture. In single-acting engines, non-return flap valves $u$ (Fig. 7) may be employed for closing the ports $e$.

I claim:

1. The method of scavenging and charging two-stroke cycle internal combustion engines, comprising drawing combustion gases under pressure from the interior of the cylinder before the exhaust begins, conveying and storing the gases thus withdrawn and causing said stored gases to flow in an ejecting jet co-operating with the exhaust of the engine whereby the remainder of the exhaust gases in the cylinder is drawn out and a fresh charge filled into the cylinder.

2. A two-stroke cycle internal combustion engine comprising in combination, means for withdrawing combustion gases under pressure from the interior of the cylinder before the exhaust begins, a receiver for storing said withdrawn gases under pressure, exhaust means for the engine cylinder, and nozzle means projecting into said exhaust means and connected to said receiver whereby the gases under pressure of flowing through said nozzle means cause the remainder of the exhaust gases in the cylinder to be ejected and the cylinder to be filled with fresh charge.

3. A two-stroke cycle internal combustion engine, comprising in combination, means for withdrawing combustion gases under pressure from the interior of the cylinder before the exhaust begins, a receiver for storing said withdrawn gases under pressure, means to control the exit of said gases from the cylinder into the receiver, exhaust means connected to exhaust ports in the engine cylinder, and nozzle means projecting into said exhaust means and connected to said receiver, whereby the gases under pressure on flowing through said nozzle means cause ejection of the remainder of the exhaust gases in the cylinder and the cylinder to be filled with a fresh charge.

4. A two-stroke cycle internal combustion engine, comprising in combination, means for withdrawing combustion gases under pressure from the interior of the cylinder before the exhaust begins, a receiver for storing said withdrawn gases under pressure, means to automatically control the period of flow of said gases from the cylinder into the receiver dependent upon the working conditions of the engine, exhaust means connected to exhaust ports in the engine cylinder, and nozzle means ending within said exhaust means and connected to said receiver, whereby the gases under pressure on flowing through said nozzle means cause the remainder of the exhaust gases in the cylinder to be ejected so that the cylinder can be filled with a fresh charge.

5. A two-stroke internal combustion engine, comprising in combination, means for withdrawing combustion gases under pressure from the interior of the cylinder before the exhaust begins, a receiver for storing said withdrawn gases under pressure, means to control the exit of said gases from the cylinder into the receiver, exhaust means connected to exhaust ports in the engine cylinder, nozzle means ending within said exhaust and connected to said receiver, whereby the gases under pressure on flowing through said nozzle means cause the remainder of the exhaust gases in the cylinder to be ejected so that the cylinder can be filled with a fresh charge, and means to control the flow of the gases under pressure from said receiver to said exhaust means.

6. A two-stroke cycle internal combustion engine, comprising a cylinder having a reciprocating piston, inlet means for the charge, and exhaust ports, and piston controlled ports provided in the engine cylinder uncovered before exhaust ports are opened for withdrawing combustion gases under pressure, a receiver for storing said withdrawn gases under pressure, an exhaust pipe connected to said cylinder exhaust ports and nozzle means ending within said exhaust pipe and connected to said receiver, whereby the gases under pressure on flowing through said nozzle means cause the remainder of the exhaust gases in the cylinder to be ejected so that the cylinder can be filled with a fresh charge.

7. A two-stroke cycle internal combustion engine, comprising in combination a cylinder having a reciprocating piston, inlet means for the charge, and exhaust ports, and piston controlled ports provided in the engine cylinder uncovered during the expansion stroke before the exhaust ports are uncovered for the purpose of withdrawing combustion gases under pressure, a receiver for storing said withdrawn gases under pressure, valve means adapted to automatically control the period of flow of said gases from the cylinder into the receiver dependent upon the working conditions of the engine, an exhaust pipe connected to said cylinder exhaust ports, nozzle means ending within said exhaust pipe and connected to said receiver, whereby the stored gases under pressure on flowing through said nozzle means cause the remainder of the exhaust gases in the cylinder to be ejected so that the cylinder can be filled with a fresh charge and means to control the flow of the gases under pressure from said receiver to the exhaust pipe.

8. A two-stroke cycle internal combustion engine, comprising in combination, a plurality of cylinders provided with reciprocating pistons, inlet means for the charge and exhaust ports, and piston controlled ports provided in each engine cylinder and uncovered during the expansion strokes before the exhaust ports are uncovered for the purposes of withdrawing combustion gases under pressure, a receiver common to said cylinders for storing said withdrawn gases under pressure, an exhaust pipe common to said cylinders and connected to the exhaust ports of all the engine cylinders, and nozzle means ending within said exhaust pipe and connected to said receiver, whereby the gases under pressure flowing continuously through said nozzle means cause the remainder of the exhaust gases in the cylinders to be ejected so that the cylinder can be filled with a fresh charge.

9. A two-stroke cycle internal combustion engine comprising a cylinder having piston controlled inlet, exhaust and pressure gas ports the exhaust ports arranged to be opened after and closed before the closure of the pressure gas ports, means for storing the pressure gases withdrawn through the pressure gas ports, an ejector connected to the exhaust ports and operated by stored gases to cause a scavenging of the cylinder by ejector action.

In testimony that I claim the foregoing as my invention I have signed my name.

ALFRED BÜCHI.